3,248,933
ULTRASONIC INSPECTION TRANSDUCER
ASSEMBLY
Larry O. Stebbins, Boulder, Colo., assignor to Automation Industries, Inc., El Segundo, Calif., a corporation of California
Filed May 16, 1963, Ser. No. 280,979
11 Claims. (Cl. 73—71.5)

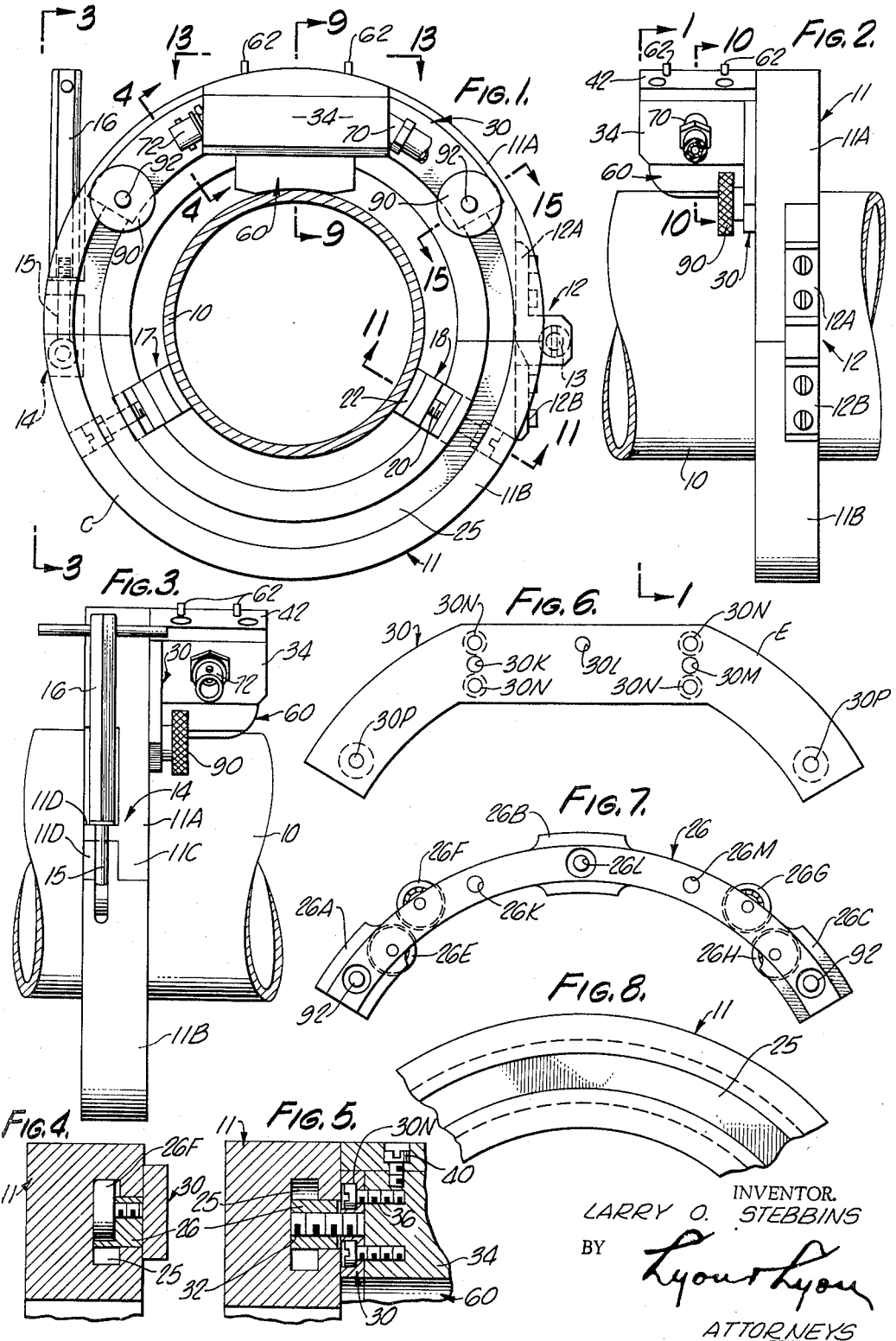
May 3, 1966  L. O. STEBBINS  3,248,933
ULTRASONIC INSPECTION TRANSDUCER ASSEMBLY
Filed May 16, 1963  2 Sheets-Sheet 1
INVENTOR.
LARRY O. STEBBINS
BY Lyon & Lyon
ATTORNEYS May 3, 1966      L. O. STEBBINS      3,248,933
ULTRASONIC INSPECTION TRANSDUCER ASSEMBLY
Filed May 16, 1963      2 Sheets-Sheet 2
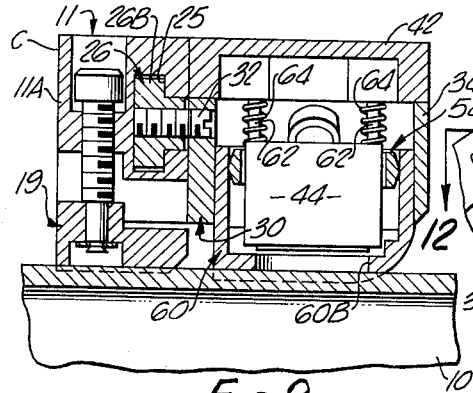
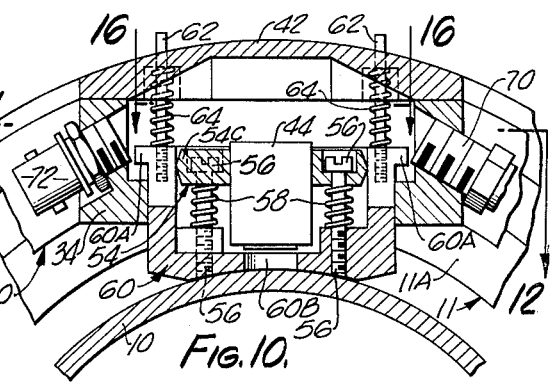
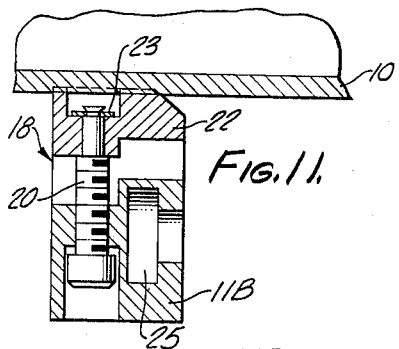
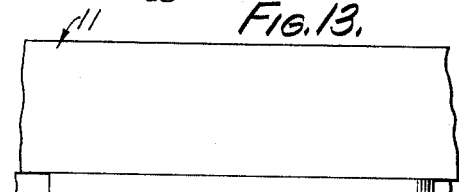
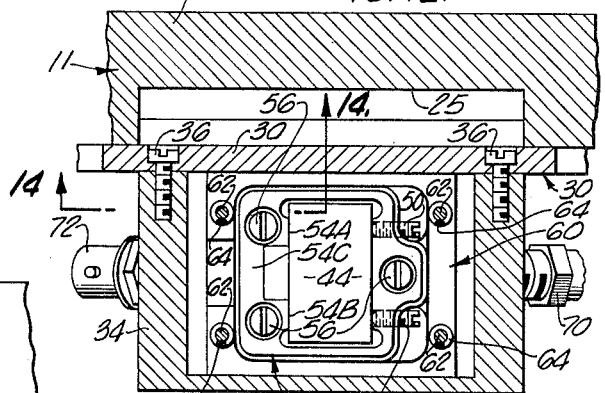
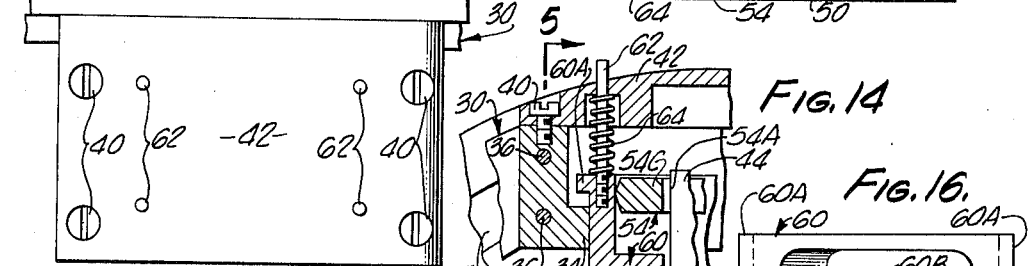
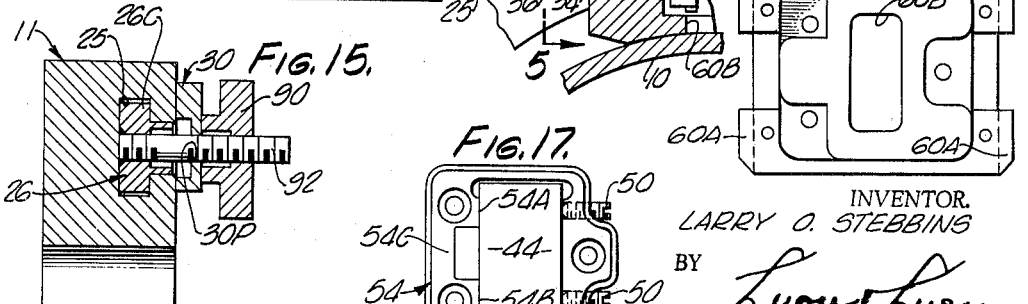
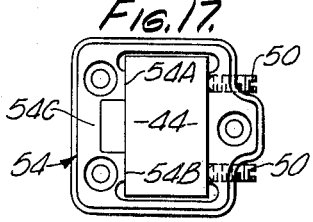
INVENTOR.
LARRY O. STEBBINS
BY Lyon+Lyon
ATTORNEYS United States Patent Office 3,248,933
Patented May 3, 1966

The present invention relates to apparatus useful in ultrasonic inspection and particularly to the apparatus of this character mountable on the exterior of a pipe, tubing or drill string.

Briefly, the apparatus described herein involves a pair of semicircular hinged segments positionable around the exterior of a pipe to form a complete ring assembly which is maintained as such by releasable clamping means between adjacent ends of said segments. Such ring assembly is releasably clamped to the pipe so as to remain stationary with respect to the pipe. Such ring assembly has an internal trackway accessible through a side wall of the ring assembly within which an arcuate carriage plate may slide. The carriage plate mounts a transducer mounting plate on which a transducer housing containing a transducer is mounted such that the transducer may be moved to scan a complete circumferential portion of the pipe. Clamping means are provided for clamping the transducer mounting plate to the ring assembly for which purpose the transducer may be adjustably maintained in a fixed position with respect to the pipe. The transducer is mounted in housing means mounted on the transducer mounting plate and is provided with a cover member, and a windowed pipe-engaging member is resiliently mounted with respect to the cover member for limited slidable movement in the housing means. The transducer itself is resiliently mounted on the pipe-engaging member to allow its independent movement in response to and for absorbing shock forces. The housing means is provided with a water connection to supply a solid column of water from the transducer and through the windowed member and to the pipe for good electrical and acoustical coupling.

It is therefore a general object of the present invention to provide improved means and techniques particularly useful in inspection of pipe.

A specific object of the present invention is to provide apparatus for these purposes which is simple in construction and in operation yet accurate in establishing precisely particular areas of a pipe at which measurements are desired.

Another specific object of the present invention is to provide apparatus having features indicated above.

Another specific object of the present invention is to provide a novel mounting for a transducer.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view of apparatus embodying the present invention mounted on a pipe, the view being in the direction indicated by the arrows 1—1 in FIGURE 2.

FIGURE 2 is a side view of the apparatus shown in FIGURE 1.

FIGURE 3 is a view taken in the direction indicated by arrows 3—3 in FIGURE 1.

FIGURE 4 is a sectional view along line 4—4 in FIGURE 1.

FIGURE 5 is a sectional view along line 5—5 in FIGURE 14.

FIGURE 6 illustrates a plate that mounts the transducer.

FIGURE 7 illustrates a position of the roller mounting structure movable in the track partially illustrated in FIGURE 8.

FIGURE 8 illustrates a portion of the roller track.

FIGURE 9 is a sectional view taken along line 9—9 in FIGURE 1.

FIGURE 10 is a sectional view taken along line 10—10 in FIGURE 2.

FIGURE 11 is a sectional view taken along line 11—11 in FIGURE 1.

FIGURE 12 is a sectional view taken along line 12—12 in FIGURE 10.

FIGURE 13 is a view taken in the direction indicated by arrows 13—13 in FIGURE 1.

FIGURE 14 is a sectional view taken along line 14—14 in FIGURE 12.

FIGURE 15 is a sectional view taken along line 15—15 in FIGURE 1.

FIGURE 16 is a view of the pipe-engaging member as seen in the direction indicated by arrows 16—16 in FIGURE 10 with parts removed.

FIGURE 17 illustrates the transducer mounted in its holder.

The drawings show the apparatus mounted on and around the pipe, tubing or casing 10 under investigation and includes an outer ring 11 having two mating and hinged semicircular ring sections 11A and 11B, the upper ring section 11A, as shown in FIGURES 1 and 2, being connected together by a hinge 12 with a hinge pin 13 passing through the hinge sections 12A and 12B bolted respectively on ring sections 11A and 11B. As seen in FIGURE 3, these ring sections 11A and 11B have interlocking tongue portions 11C and 11D respectively which are maintained in the position shown by a releasable clamping structure 14 which involves a clamping bolt 15 swivelly mounted on ring half 11B and an elongated nut 16 on such bolt and bearing on the shouldered portion 11D on ring half 11A.

This ring 11 is stationarily mounted on the pipe 10 using three equally circumferentially spaced clamping structures 17, 18, 19 (FIGURES 1 and 9), details of each of which are described now in connection with FIGURE 11 wherein the ring half 11B has a shouldered clamping bolt 20 threaded and recessed therein with the shouldered portion of the bolt bearing against the clamp member 22 to press and maintain its generally arcuate face in clamping engagement with the exterior surface of pipe 10. This member 22, when not thus clamped, is retained on the outer end of bolt 20, on its reduced diameter portion, by a split spring washer 23 on such bolt.

The ring halves 11A, 11B are formed with mating trackways which provide a continuous circular trackway when the ring halves are bolted together as described above, this trackway being identified by the numeral 25 and having slidably mounted therein an arcuate carriage plate 26 (FIGURES 6 and 9). This carriage plate 26 may be initially inserted into such trackway in one of the ring halves when the ring halves 11A, 11B are hinged apart.

The carriage plate 26 as seen in FIGURE 7 has three enlarged portions 26A, 26B, 26C cooperating with the top and lower U-shaped portions of trackway 25 for its retention in such trackway and preferably the carriage plate 26 has mounted thereon two pairs of rollers 26E, 26F, 26G, and 26H which contact such trackway to facilitate movement of the carriage plate in the trackway.

A transducer mounting plate 30 (FIGURES 6 and 9) is mounted on the carriage plate or segment 26 using three set screws 32 threaded in the matching tapped holes 26K, 30K; 26L, 30L; and 26M; 30M (FIGURES 6 and 7) in the carriage plate 26 and transducer mounting plate 30, respectively.

The transducer mounting plate 30 has bolted thereon the lower part of the transducer casing or housing 34 (FIGURES 5 and 9) using four bolts 36 which pass respectively through the recessed holes 30N (FIGURES 5, 6 and 12) and are threaded in the transducer casing 34. It is seen in FIGURE 12 that a portion of the mounting plate 30 also serves as a housing element for the transducer 44.

Mounted on the top of housing member 34 by bolts 40 (FIGURES 5 and 14) is the housing cover 42.

The transducer 44 is shock-mounted in the housing 34, 42 using the following described construction. A conventional transducer 44 (FIGURES 12 and 17) is held by set screws 50 against side walls 54A and 54B of its holder 54 which is provided also with a base portion 54C having three apertured holes through which three bolts 56 extend. These bolts 56 extend also through corresponding prestressed coil compression springs 56 (FIGURE 10) and are threaded into the windowed pipe-engaging member 60 which has its outer surface arcuately formed. The member 60, in turn, is resiliently mounted in the housing 34, 42 using four threaded screws 62 which pass through corresponding prestressed coil compression springs 64 and are threaded into member 60, the springs 64 being compressed between the member 60 and cover 42 and the upper ends of screws 62 in FIGURE 10 being free to slide in slightly oversized openings in the cover member 42. Outward movement of the transducer is limited (when the member 60 does not engage a pipe) by an extension 60A on member 60 engaging an inner shouldered portion of housing member 34.

It will be thus seen that transducer 44 is resiliently mounted on the pipe-engaging member 60 and in turn the member 60 is resiliently mounted on housing 34, 42. Preferably the force exerted by springs 64 resiliently mounting the member 60 is stronger than the force exerted by springs 58 resiliently mounting the transducer 44. It will also be seen that there is a sliding fit between the transducer holder 54 and the inner wall of member 60 such that these two elements may move relative to each other.

The housing member 34 is provided with a water fitting 70, the former being for the purpose of providing a stream of water into the housing with such water flowing in a solid liquid column between the transducer 44 and the window 60B to provide good electrical or acoustical coupling between the transducer 44 and that portion of the pipe facing window 60B.

The housing member 34 is provided also with a coaxial electrical connector 72 through which electrical connections are made to the transducer 44 with a coaxial cable (not shown) extending from the connector 72 to a conventional electrical connector (not shown) on the transducer, the latter connector being positioned so that it is accessible upon removal of cover 42.

It will thus be seen from the foregoing description that the transducer 44 may be moved in a circular path around the pipe for the inspection of different portions along the circumference of the pipe, with the carriage plate 26 being movable in the track or guideway. Means are provided also to lock the transducer in any selected position along such circumference. Such means involves the use of one or both of the knurled clamping nuts 90 as now described in connection wth FIGURE 15 wherein a stud bolt 92 on carriage plate 26 extends through aperture 30P in transducer mounting plate 30 and has the knurled nut threaded on it. By tightening nut 90, the transducer mounting plate 30 is clamped stationarily with respect to the ring 11 and thus is no longer free to move with respect to the pipe to which the ring 11 is clamped.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Apparatus for inspection of pipe in which an ultrasonic transducer transmits energy into the pipe and receives resulting echoes therefrom, the combination comprising, two hinged semicircular ring segments, means hinging said segments at first adjacent ends thereof, means releasably clamping second adjacent ends thereof to form a complete ring, said ring having an extended side in a plane extending generally parallel to the plane of said ring, an open trackway in said side, a carriage plate in the form of a segment of a circle in said trackway, a transducer mounting plate mounted on said carriage plate and contacting said side along the length of said mounting plate, a transducer housing mounted on said mounting plate, a pipe-engaging member, means resiliently mounting said member on said housing, a transducer, means resiliently mounting said transducer on said pipe-engaging member, said member being apertured to provide a window between said transducer and said pipe, a water connection to said housing for providing water between said transducer and said window, means releasably clamping said ring to the pipe, and means releasably clamping said mounting plate to said ring.

2. Apparatus for inspection of pipe in which an ultrasonic transducer transmits energy into the pipe and receives resulting echo signals therefrom, the combination comprising, a multisection ring structure comprising at least two segments, means hinging adjacent sections, means releasably clamping adjacent segments to form a ring, means releasably clamping said ring to the pipe, transducer means slidably mounted along the circumference of said ring, and releasably clamping means for securing said transducer means on said ring.

3. Apparatus for inspection of pipe wherein an ultrasonic transducer transmits energy into the pipe and receives resulting echoes therefrom, the combination comprising, a multisection ring structure comprising a plurality of segments, means interconnecting said segments for assembly around the pipe as a complete ring, means releasably clamping said ring on the pipe, means defining a trackway along said ring, transducer means, means slidably mounting said transducer means on said trackway, and means releasably clamping said transducer means on said ring.

4. Apparatus for inspection of pipe in which an ultrasonic transducer transmits energy into the pipe and receives resulting echoes therefrom, an articulated assembly of segments, first means releasably clamping said segments around a pipe to form a ring around the pipe, second means releasably clamping said assembly on the pipe, transducer means, third means slidably mounting said transducer means on said assembly for movement around said ring, and fourth means releasably clamping said transducer means on said assembly.

5. Apparatus as set forth in claim 4 in which said assembly is articulated by hinge means hinging adjacent ones of said segments.

6. Apparatus as set forth in claim 4 in which said first means includes a bolt swivelly mounted on one of said segments, a nut threaded on said bolt and engaging a shouldered portion on an adjacent one of said segments.

7. Apparatus as set forth in claim 4 in which said second means includes a clamping member having a face conforming generally with the exterior surface of the pipe, a bolt threaded on said assembly having a shouldered portion engaging said clamping member to press said face against the pipe, and means securing said bolt on said clamping member.

8. Apparatus as set forth in claim 7 in which said securing means includes a reduced diameter portion of said bolt passing through an apertured portion of said clamping member.

9. Apparatus as set forth in claim 4 in which said third means includes a trackway in said ring, a carriage plate slidably mounted in said trackway, and means mounting said transducer means on said carriage plate.

10. Apparatus as set forth in claim 9 in which said fourth means includes a stud bolt on said carriage plate, a mounting plate slidably mounted on said carriage plate and carrying said transducer means, said stud bolt passing through an apertured portion of said mounting plate, and means threaded on said bolt for clamping said mounting plate on said assembly.

11. In apparatus of the character described, a transducer housing means, a cover element releasably secured to said housing means, ultrasonic transducer means within the housing, a transducer holder, means releasably securing said transducer on said holder, said holder being slidably mounted on said housing means, a material contacting member having an apertured portion defining a window between said transducer and the material contacted by said member, means resiliently mounting said holder on said member, means resiliently mounting said member on said cover, and motion limiting means between said member and said housing means.

References Cited by the Examiner
UNITED STATES PATENTS

| | | | |
|---|---|---|---|
| 2,908,161 | 10/1959 | Bincer | 73—67.8 |
| 2,940,305 | 6/1960 | Williams et al. | 73—67.8 |
| 3,107,521 | 10/1963 | McClure | 73—67.8 |
| 3,209,582 | 10/1965 | Greenberg et al. | 73—67.8 |

RICHARD C. QUEISSER, *Primary Examiner.*